Figure 1:
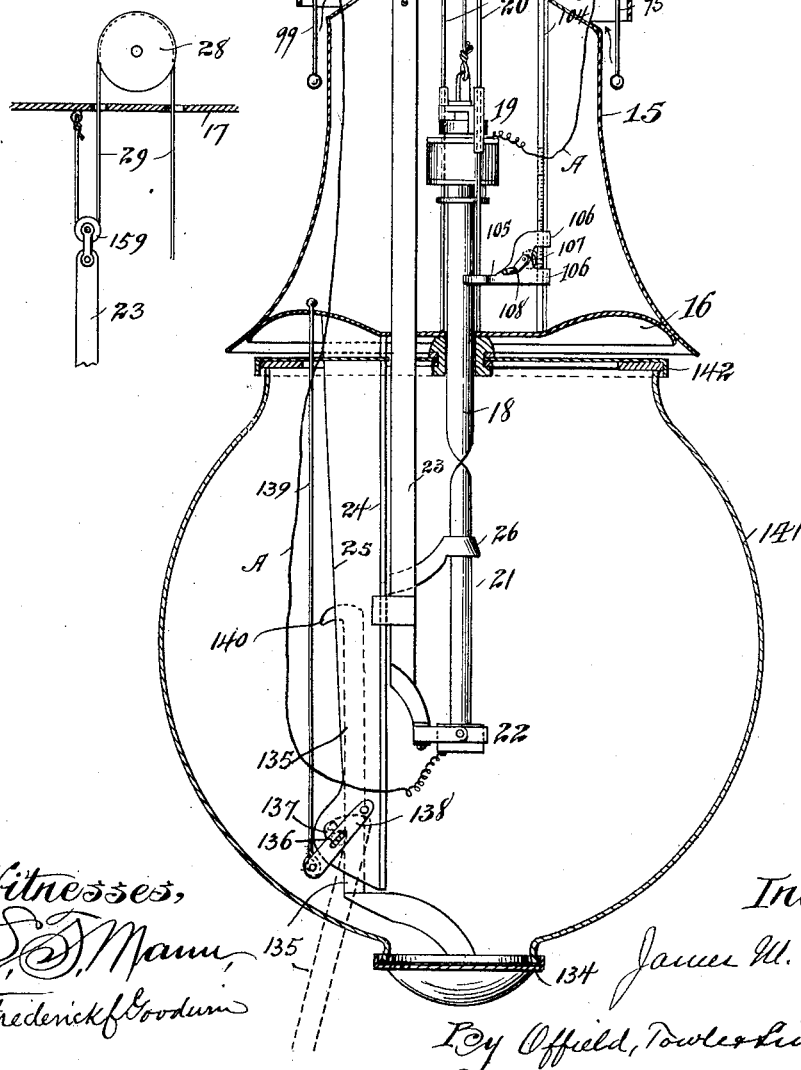

No. 634,157. Patented Oct. 3, 1899.
J. M. WILLARD.
ELECTRIC ARC LAMP.
(Application filed July 11, 1898.)

(No Model.) 7 Sheets—Sheet 1.

No. 634,157. Patented Oct. 3, 1899.
J. M. WILLARD.
ELECTRIC ARC LAMP.
(Application filed July 11, 1898.)
(No Model.) 7 Sheets—Sheet 3.

Witnesses,
Inventor,
James M. Willard,
By Offield, Towle & Linthicum,
Attys.

No. 634,157. Patented Oct. 3, 1899.
J. M. WILLARD.
ELECTRIC ARC LAMP.
(Application filed July 11, 1898.)

(No Model.) 7 Sheets—Sheet 4.

Witnesses, Inventor,
James M. Willard,
By Offield, Towle & Linthicum,
Attys.

No. 634,157. Patented Oct. 3, 1899.
J. M. WILLARD.
ELECTRIC ARC LAMP.
(Application filed July 11, 1898.)

(No Model.) 7 Sheets—Sheet 5.

Witnesses,

Inventor,
James M. Willard,
By Offield, Towle & Linthicum,
Attys.

No. 634,157. Patented Oct. 3, 1899.
J. M. WILLARD.
ELECTRIC ARC LAMP.
(Application filed July 11, 1898.)
(No Model.) 7 Sheets—Sheet 6.
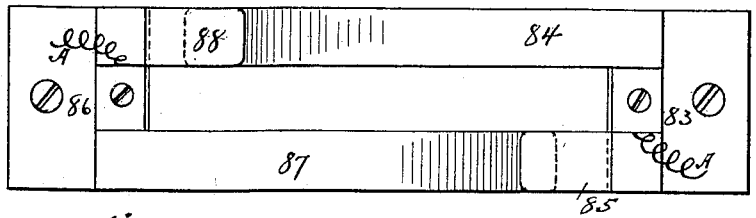
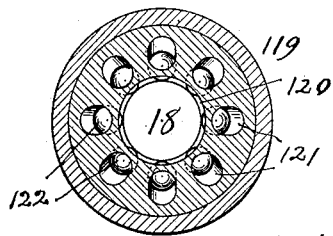
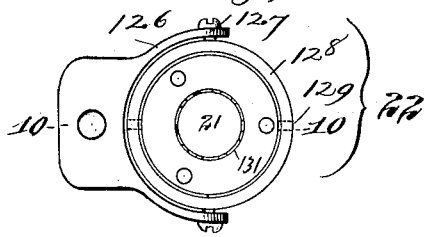
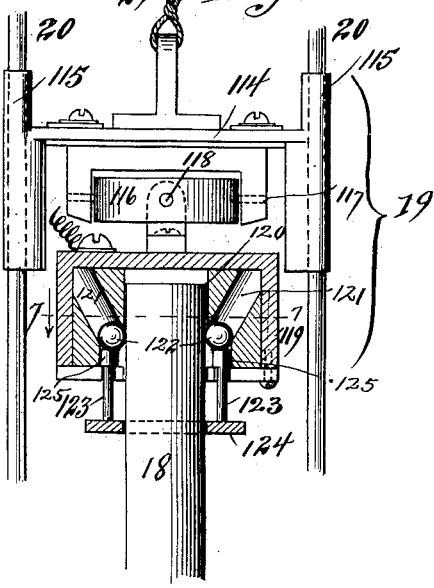
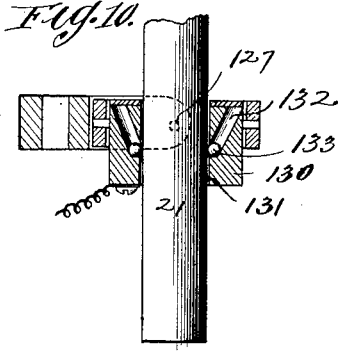
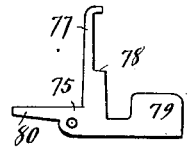
Witnesses,
Inventor,
James M. Willard,
By Offield, Towle & Linthicum,
Att'ys.
THE NORRIS PETERS CO., PHOTO-LITHO., WASHINGTON, D. C.

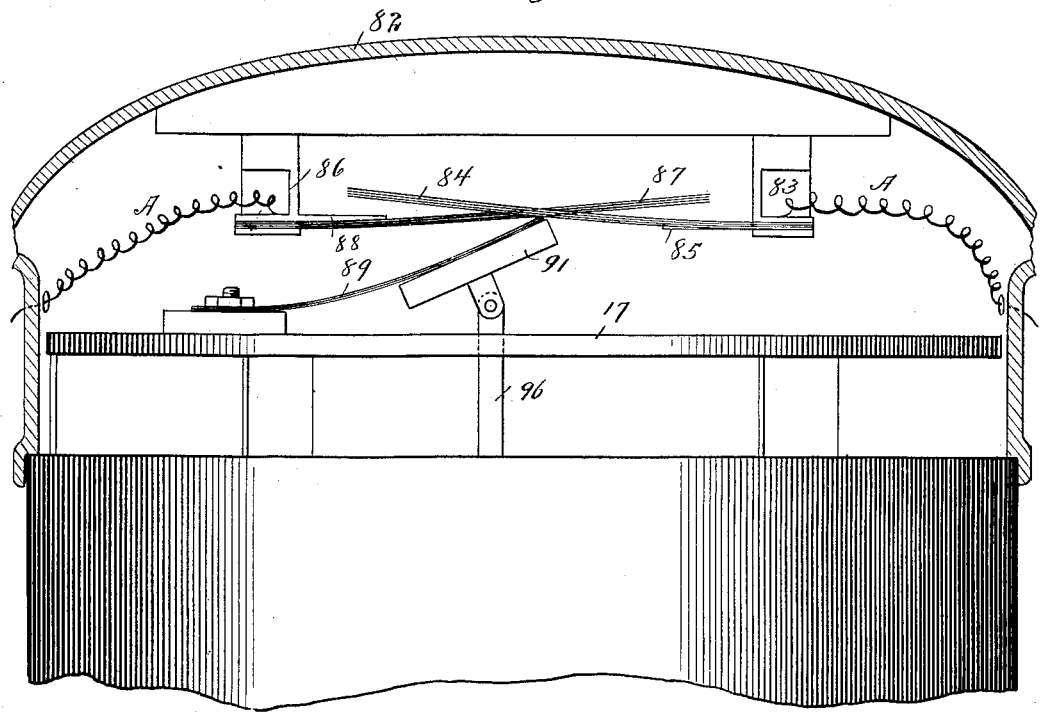

UNITED STATES PATENT OFFICE.

JAMES M. WILLARD, OF DECATUR, ILLINOIS.

ELECTRIC-ARC LAMP.

SPECIFICATION forming part of Letters Patent No. 634,157, dated October 3, 1899.

Application filed July 11, 1898. Serial No. 685,712. (No model.)

*To all whom it may concern:*

Be it known that I, JAMES M. WILLARD, of Decatur, in the county of Macon and State of Illinois, have invented certain new and useful Improvements in Arc-Lamps, of which the following is a specification.

This invention relates to electric-arc lamps, and more particularly to that class in which a positive feed is employed for feeding the two carbons toward each other, as contradistinguished from the gravity-feed lamps in ordinary use, in which the lower carbon is stationary and the upper carbon is fed toward the same by gravity, its feed being controlled by a brake mechanism which is in turn controlled by the current.

My present invention has for its chief object to provide a lamp which, by reason of its positive feed, shall produce a steady arc, free from variations which will affect the steadiness of the light and which shall also be free from the various objections attendant upon the gravity-feed lamp in ordinary use.

My invention has for a further object to provide a lamp wherein the carbons will be consumed at a comparatively low rate of speed, thereby increasing the length of time which the lamp will run without requiring retrimming, and at the same time reducing the expense of renewal of the carbons without diminishing the illuminating power of the lamp by the use of double globes or similar devices.

Another object of my invention is to provide means for automatically cutting out the individual lamp at any predetermined time in such a manner as to prevent the cutting in again of the same by the use of the ordinary switch, so that the consumer is practically prevented from turning on the light again after it has been automatically cut out at the proper time.

My invention has for a further object to simplify and improve the means for holding the carbons, and also the means for holding the globe, so as to facilitate the handling, removal, and replacing of these parts.

To these and other ends my invention consists in certain novel features which I will now proceed to describe and will then particularly point out in the claims.

Figure 2:
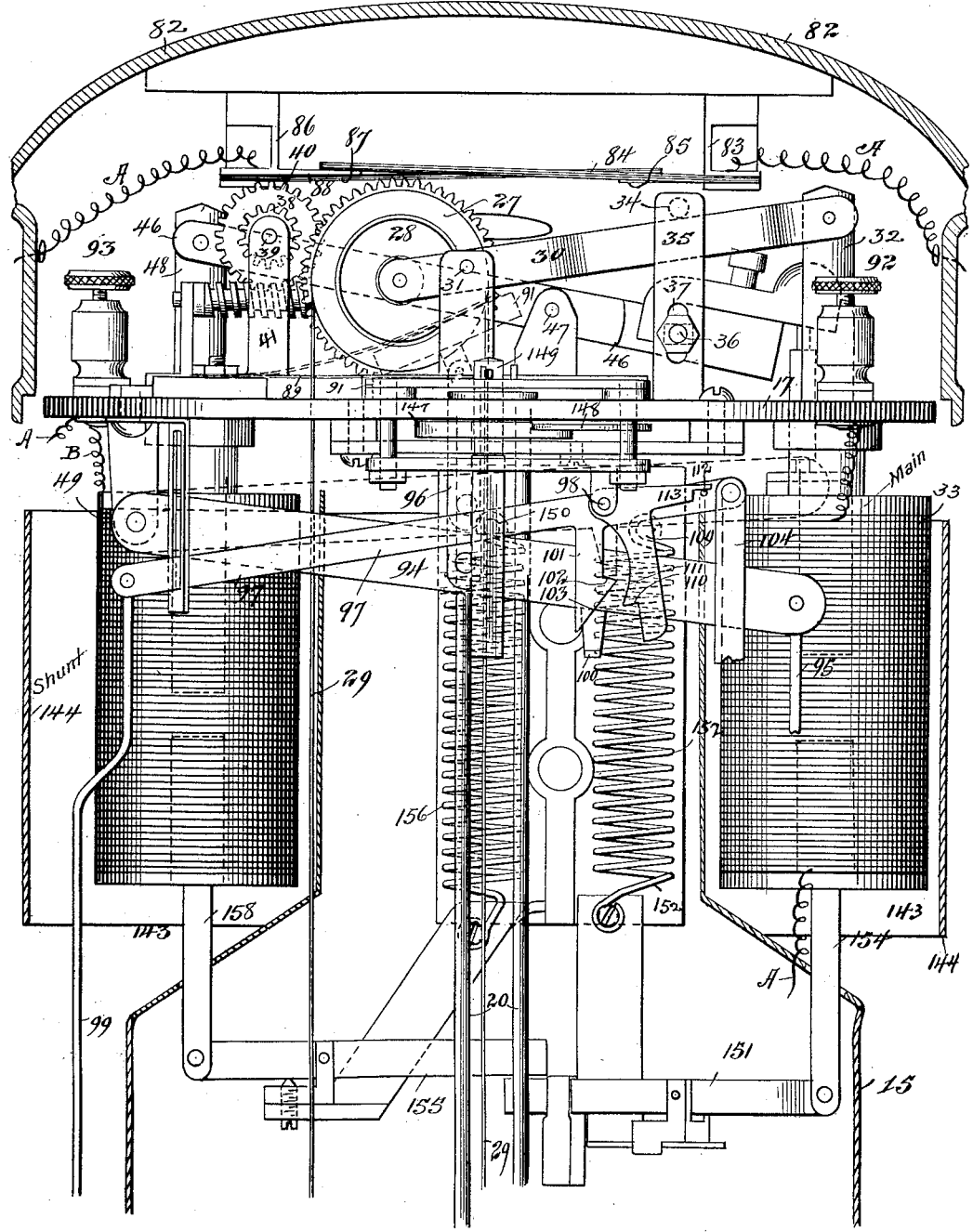
Figure 3:
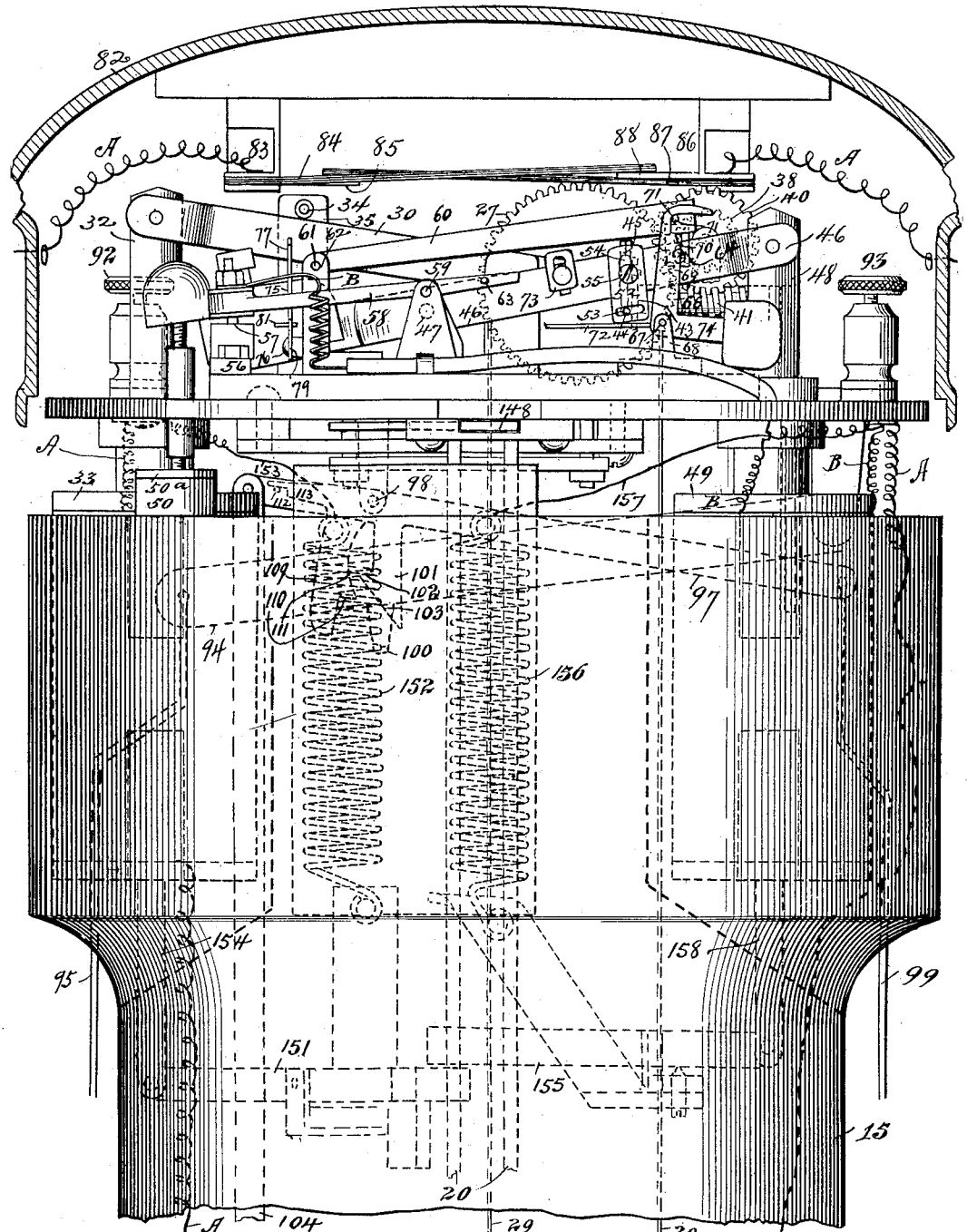
Figure 4:
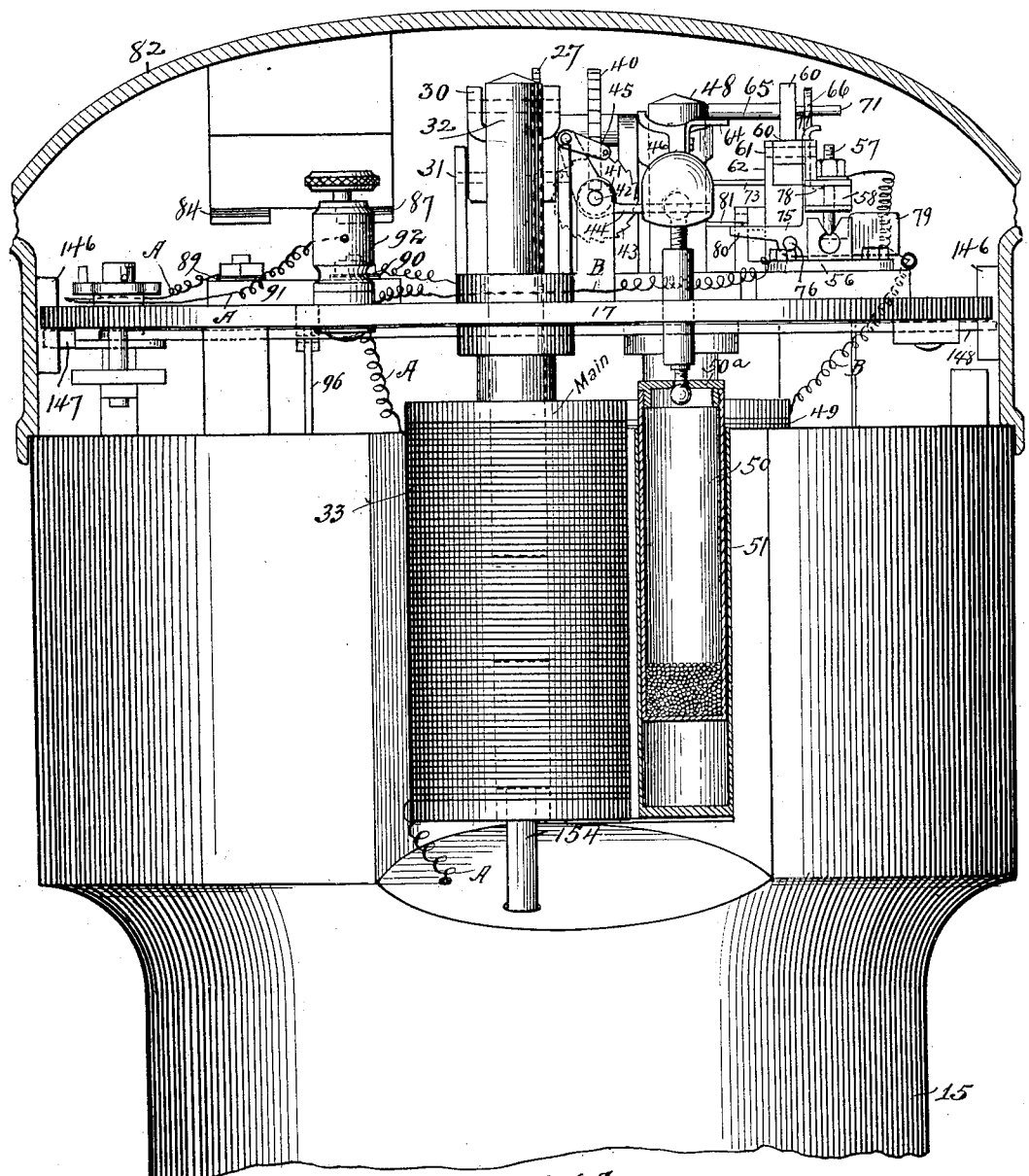
Figure 5:
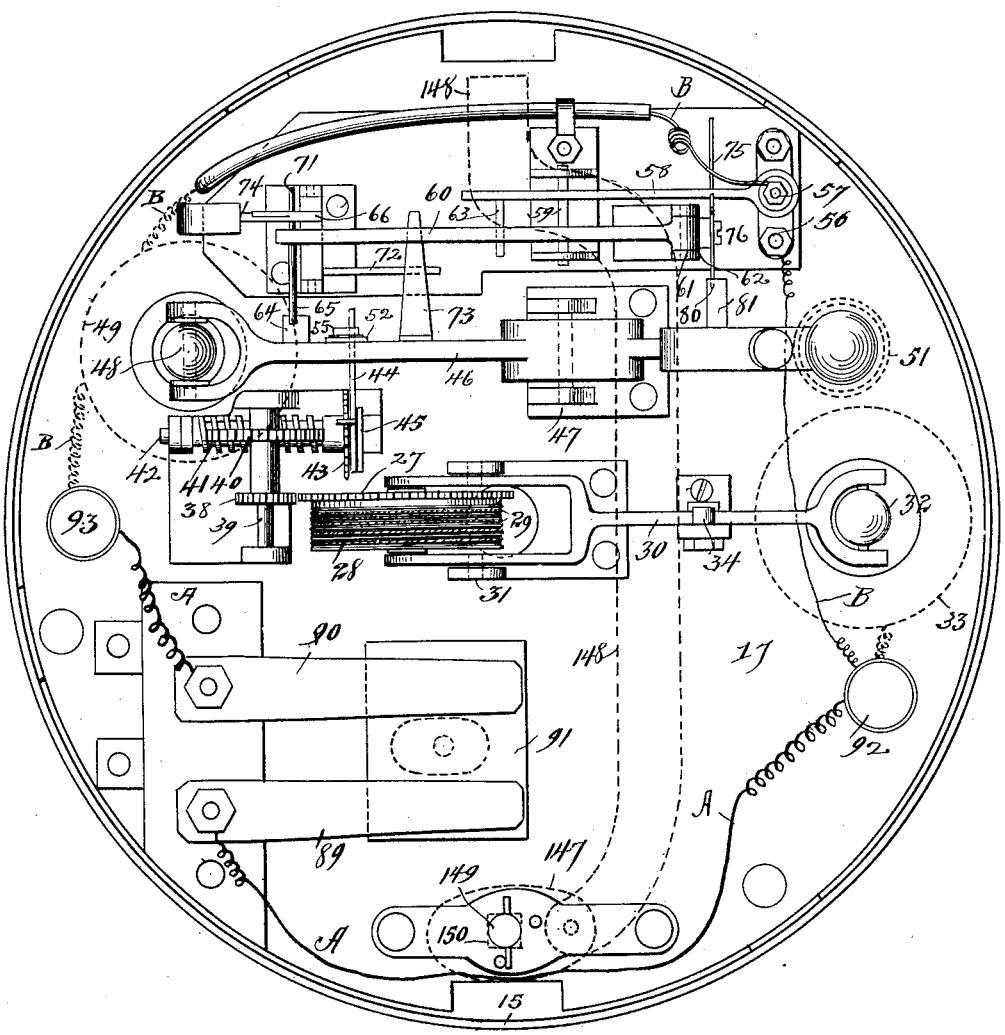

In the accompanying drawings, Figure 1 is an elevation of a lamp embodying my invention, the lower portion of the casing and the globe being in section. Fig. 2 is a front elevation, on a larger scale than Fig. 1, of the regulating mechanism contained in the upper part of the lamp, the casing and cap being shown in section and the latter being shown in a raised position. Fig. 3 is a view similar to Fig. 2, but taken from the opposite or rear side of the lamp. Fig. 4 is a side elevation of the upper part of the lamp, the cap being shown in section and in position on the casing. Fig. 5 is a plan view of the top of the lamp with the cap removed. Fig. 6 is an inverted plan view of the upper member of the switch or cut-out. Fig. 7 is a detail plan section of the upper-carbon holder taken on the line 7 7 of Fig. 8. Fig. 8 is a detail elevation, partly in vertical section, of the upper-carbon holder. Fig. 9 is a detail plan view of the lower-carbon holder. Fig. 10 is a vertical sectional view of the same taken on the line 10 10 of Fig. 9. Fig. 11 is a detail view of the circuit-breaker latch detached. Fig. 12 is a detail view illustrating a modification; and Fig. 13 is a detailed view, partly in section, through the casing, illustrating the cut-out free from surrounding mechanism.

In the said drawings, 15 indicates a suitable casing, provided with a bottom plate 16 and a top plate 17, the latter serving as a support for the mechanism by means of which the carbons are fed toward each other. The carbons may be supported and guided in any suitable manner; but I prefer to employ for these purposes a construction which I have devised and which will be hereinafter described in detail. For the present it is sufficient to state that the upper carbon 18 is supported in a holder 19, which slides upon vertical guides 20 within the casing, while the lower carbon 21 is held in a support 22, carried on the lower end of a sliding bar 23, which latter travels on a guide 24, formed on the face of an arm 25, extending downward from the lower plate 16.

26 indicates a suitable fixed guide extending upward from the arm 25, through which guide the lower carbon 21 passes.

Motion is imparted to the carbon by means of a wheel 27, which is actuated in the manner hereinafter described. In the present instance this motion is transmitted by providing the wheel 27 with a drum 28, around which is coiled a wire, cord, or other flexible connecting device 29, one end of which is connected to the carbon-holder 19, while the other end thereof is connected to the rod or bar 23. It will be seen that when the wheel 27 is rotated in one direction the carbons will approach each other, while rotation of the wheel in an opposite direction will cause the carbons to recede from each other. The wheel 27 is mounted to revolve at one end of a lever 30, which is pivoted between its ends, as shown at 31, on a suitable standard or support on the top plate 17. The other end of the lever 30 has pivotally connected to it the core 32 of a solenoid 33, located in the main circuit. The weight of the wheel 27 and its connected parts is sufficient to normally depress that end of the lever to which it is connected, and a stop 34 is provided to limit this depression, said stop consisting of a pin on the upper end of a standard 35, mounted on the plate 17. The motion of the lever in the opposite direction is limited by means of a pin 36, which is vertically adjustable in a slot 37 in the standard 35.

When the wheel 27 is raised, said wheel, which is a gear-wheel, meshes with a pinion 38 on a shaft 39, mounted in suitable bearings on the plate 17, said shaft also carrying a worm-wheel 40, which meshes with a worm 41, the shaft 42 of which is provided with a ratchet-wheel 43. This ratchet-wheel is given a step-by-step movement by means of a lever 44, which is mounted loosely on the shaft 42 and which has a pawl 45, pivoted to one of its arms and adapted to engage the ratchet-wheel and advance the same one step at each vibration of the lever 44. This vibration is accomplished by means of an actuating-lever 46, which is pivoted at 47 on a suitable standard or support on the plate 17. One end of this lever is connected to the core 48 of a solenoid 49, located in a shunt-circuit, while its other end has connected to it the piston 50 of a dash-pot 51. In order to regulate the action of the actuating-lever 46, the weight of the piston 50, which also serves as a counterweight to lift the other end of said lever when the solenoid 49 is deënergized, is made adjustable. For this purpose I prefer the construction shown in detail in Fig. 4, in which the piston 50 is shown as hollow and as provided with a removable cap 50ª so that access may be had to the interior of said piston. This hollow piston may thus be weighted with shot or other heavy material suitably subdivided so as to permit of an accurate adjustment of its weight to the conditions which it is desired to meet. The lever 44 engages with the vibrating actuating-lever 46 by means of that arm thereof which does not carry the pawl 45, and to effect this engagement and provide for an adjustment of the stroke of the pawl relatively to the ratchet-wheel there is mounted on the lever 46 a plate 52, which has a slot 53, with which the end of the lever 44 engages. The plate 52 is provided with a vertical slot 54, through which passes a clamping-screw 55, by means of which said plate is secured to the lever 46 in such a manner that it may be vertically adjusted thereon, and thereby regulate the limits of the throw of the pawl 45.

A vibrating motion is imparted to the lever 46 by alternately making and breaking the shunt-circuit in which the solenoid 49 is located, and to this end a suitable circuit-breaker is employed, which is actuated by the lever 46. In the construction shown this consists of a fixed plate or post 56, to which one side of the shunt-circuit is connected, the other side being connected to an insulated pin 57 on a vibrating lever 58, which is pivoted on an axis 59 in suitable standards on the plate 17. This circuit-breaking lever 58 is so constructed and arranged that that end thereof which carries the pin 57 is normally depressed so as to close the shunt-circuit. In order to raise the circuit-breaking lever and break the shunt-circuit, I employ an intermediate lever 60, which is pivoted at one of its ends, as shown at 61, upon a standard 62 on the plate 17. The lever 58 is provided on that side of its axis opposite to that which carries the pin 57 with a pin or arm 63, which lies under and in the path of the intermediate lever 60 and is adapted to be engaged thereby. The intermediate lever 60 is operated by means of the actuating-lever 46, which latter has adjustably mounted on it a tappet-plate 64, the intermediate lever 60 being provided with a pin 65, which extends over said tappet-plate in the path thereof, so that during its upward movement said tappet-plate engages said pin and lifts the lever 60. In order to maintain the intermediate lever 60 in this raised position until almost the end of the stroke of the actuating-lever, I employ a latch 66, which is pivoted at 67 on a suitable standard 68 and which is provided with a vertical arm 69, having a shoulder 70, which is adapted to receive a pin 71 on the free end of the lever 60. Said latch is also provided with an arm 72, arranged below and in the path of a tappet-arm 73, adjustably secured to the actuating-lever 46. The arm 69 of the latch 66 is normally actuated to hold its shoulder 70 in the path of the pin 71 by means of a weighted arm 74 or other suitable means.

In order to maintain the circuit-breaking lever 58 in a raised position after it has been lifted by the intermediate arm 60, I employ a latch 75, which is pivoted at 76 on the standard 62 and which is provided with a vertical arm 77, having a shoulder 78, with which the lever 58 engages, said latch being provided with a counterweight 79 or other suitable means for moving the vertical arm into position to engage its shoulder with said lever and being also provided with an arm 80, which extends into the path of a tappet 81, which is adjustably secured to the lever 46. This carbon-feeding mechanism operates in the following manner: When the lamp is switched into the circuit, the current, passing through the solenoid 33, attracts the core 32 and depresses that end of the lever 30, raising the other end of said lever, which carries the wheel 27 and drum 28. This upward movement of the drum causes an upward movement of both carbons until the gear-teeth of the wheel 27 come into contact with the pinion 38. This pinion being stationary at the time, rotation is imparted to the wheel 27 and drum in such a direction as to cause through the flexible connections 29 a separation of the carbons which will establish the arc. At the same time a portion of the current passing through the shunt-circuit will energize the solenoid 49 and the core 48 thereof will be attracted, thereby depressing that end of the lever 46. This downward movement of the lever 46 depresses that end of the lever 44 which is in engagement therewith and through the pawl 45 actuates the ratchet 43 to impart to the worm-shaft 42 a slight motion of advance. The rotary movement thus imparted to the worm 41 is transmitted through the worm-wheel 40 to the shaft 39 and thence through the pinion 38 to the gear-wheel 27. The drum 28 is thus rotated a very minute fraction of an inch, thereby feeding the upper carbon downward and the lower carbon upward toward each other through the medium of the connections for that purpose. As the lever 46 approaches the limit of its downward stroke the tappet 73 thereof will come into contact with the arm 72 of the latch 66 and will withdraw said latch from underneath the intermediate lever 60. This latter will then fall quickly, and striking upon the pin or arm 63 of the circuit-breaking lever 58 will sharply depress the rear end of said lever and as sharply lift the forward end, carrying the pin 57 away from the plate or block 56, and thus breaking the shunt-circuit in a practically instantaneous manner. As soon as the shunt-circuit is broken the solenoid 49 is deënergized and the piston 50, which more than counterbalances the weight of the core 48, will depress that end of the lever to which said piston is attached and raise the other end, to which the core is attached. This movement will of course be somewhat gradual, owing to the resistance offered by the air to the sinking of the piston in the dash-pot. I have found that in practice the mechanism described when employed without the piston and dash-pot will operate in feeding in an irregular manner, making a series of quick-feeding movements followed by a period of inaction, and thereby causing irregularity in the feed and in the arc. The employment of the piston and dash-pot in connection therewith serves, however, to give regularity to the feed, the motion of the feeding mechanism being relatively slow but constant and varying only within comparatively small limitations, according to the circumstances of the case. The means provided for varying the weight of the piston enables me to determine the length of the arc, which is proportioned, of course, to the resistance offered by such weight to the action of the solenoid 49 upon its core 48 at the opposite end of the lever 46. I am thus enabled to regulate the length of the arc with great nicety and to insure a steady, gradual, and constant feed. It should be noted that as soon as the circuit-breaking lever 58 has been lifted in order to break the circuit the latch 75 has swung over so as to bring its shoulder 78 underneath said lever 58, thereby maintaining said lever in a raised position. As the lever 46 moves upward on its return stroke the tappet-plate 64 engages the pin 65 of the intermediate lever 60 and lifts the same to its original position, the lever 58 being maintained in its raised position during this upward movement of the intermediate lever by means of the latch 75. When the intermediate lever 60 approaches the upward limit of its motion, its latch 69 is thrown forward to hold it in such raised position by means of its counterweighted arm 74. Immediately thereafter the tappet 81 strikes the arm 80 of the latch 75 and withdraws the shoulder 78 of said latch from under the circuit-breaking lever 58, whereupon said lever instantly falls and thereby reëstablishes the shunt-circuit, thereupon the series of operations already described begin again, the actuating-lever 46 making a down-stroke and through the pawl and ratchet, worm and gear, and spur-gearing feeding the carbons another step toward each other until the shunt-circuit is again broken, whereupon the lever rises in the manner just described. In this way a slow movement of vibration is imparted to the actuating-lever and a step-by-step feed of very minute proportions is given to the carbons toward each other. The mechanism described is of such a nature that the shunt-circuit is broken and reëstablished almost instantaneously as to each of these operations, instead of being gradually broken and gradually reëstablished, and sparking and irregularity of movement of the motor are thereby avoided.

As heretofore stated, the solenoid 33 is in the main circuit, while the solenoid 49 and circuit-breaker are in a shunt-circuit. This former or main circuit, which is indicated by the letter A throughout its course, enters the lamp through a switch or cut-out, which may be of any suitable construction, but which I prefer to construct in the manner shown, the construction illustrated being of my invention. In this construction the upper part of the switch or cut-out is located within the cap 82, on the under side thereof, the incoming wire being connected to a block or post 83, which has secured to it the fixed end of a spring-arm 84, of conducting material, said arm being preferably composed of a plurality of leaves of copper. The block 83 also carries a contact 85. The outgoing wire is connected to a similar post 86, which has a spring-arm 87, which normally engages the contact 85, and a contact 88, with which the free end of the spring 84 is normally in contact. Upon the top of the plate 17 is located the coöperating member of the switch or cut-out, comprising a spring-arm 89, which is adapted to contact with the spring-arm 84, and a similar spring-arm 90, which is adapted to contact with the spring-arm 87. The free ends of these spring-arms are connected to or supported by a block 91, of insulating material, whereby said arms may be simultaneously raised and lowered by means of a suitable mechanism—such, for instance, as that hereinafter described and which I have devised for this purpose. When the arms 89 and 90 are raised so as to make contact with the arms 84 and 87, the main circuit passes through said arms 84 and 89 to a suitable binding-post 92 on the plate 17, thence to the solenoid 33, thence to the upper carbon 18 to the lower carbon 21, and returning from the lower-carbon holder 22 is connected to a binding-post 93 on the plate 17. From this latter it is connected to the spring-arm 90 and passes thence to the spring-arm 87, post 86, and the outgoing wire.

The shunt-circuit, which is lettered B throughout its length, passes from the binding-post 92 to the plate or post 56 and thence to the pin 57, from which latter it extends to the solenoid 49 and thence to the binding-post 93.

The mechanism which I have devised for operating the switch or cut-out is constructed in the following manner: A lever 94 is pivoted at one of its ends on the under side of the plate 17 and has connected to its other or free end an operating-rod 95, which extends downward through the upper part of the casing and is accessible from the exterior thereof, as shown in Fig. 1. Between its ends there is pivotally connected to the lever 94 a link 96, the upper end of which is connected to the block 91, so that when the lever 94 is moved upward by an upward pressure on the actuating-rod 95, said block 91 will lift the free ends of the spring-arms 89 and 90 into contact with the spring-arms 84 and 87. In order to maintain the parts in this raised position and at the same time make provision for their release when desired, I employ a releasing-lever 97, which is pivoted at 98 to a suitable support on the under side of the plate 17 and which is provided with an actuating-rod 99, which extends downward through the casing and which is accessible on the exterior thereof, the arangement being preferably such that the actuating-rods 95 and 99 are located on opposite sides of the casing. The lever 94 is provided with a laterally-projecting finger 100, and the lever 97 is provided with a downwardly-extending arm 101, having a horizontal shoulder 102 and a bevel or incline 103 extending from its point upward to said shoulder. When the lever 94 is pressed upward, the finger 100 will strike the incline 103 and will force the arm 101 and the lever 97 laterally and upwardly until said finger has cleared the incline, when the lever 97 will drop and the shoulder 102 will pass under the finger 100, thereby maintaining the lever 94 and the switch-block in an elevated position. When it is desired to release the lever 94 to lower the switch-block, upward pressure is exerted on the actuating-rod 99, which will withdraw the shoulder 102 from under the finger 100, allowing the lever 94 and the switch-block to drop, thereby cutting out the lamp. Provision is also made for cutting out the lamp at any predetermined time, and for this purpose I extend the lever 97 beyond its pivot, as shown in Fig. 2, and I connect to the extended end a rod or bar 104, which extends downward from its connection with said lever in a position parallel with the guides 20 of the upper-carbon holder. Upon this rod 104 is adjustably mounted a stop-arm 105, which projects into the path of the upper-carbon holder 19 below the same. In the construction shown the stop-arm is provided with loops 106, which embrace and slide upon the rod 104, and with a cam or eccentric 107, operated by a crank-handle 108, so that said stop-arm may slide to any desired position upon the rod 104 and there locked by turning the crank-handle so as to cause the cam or eccentric to bind against the rod. The rod 104 may be and preferably is graduated to represent the hours which the lamp will burn, the graduation being such that when the stop-arm is locked upon the rod at any given mark the upper-carbon holder will come into contact with the stop-arm at the corresponding hour or after the lamp has been burning a corresponding length of time. It will be seen that, after the stop-arm 105 has been set to cut out the lamp at the desired time, when the upper-carbon holder in its descent strikes the stop-arm 105 it will carry said arm and the rod 104 downward along with it and will depress that end of the lever 97 to which said rod is connected, thereby raising the other end of the lever and withdrawing the shoulder 102 from under the finger 100, thereby automatically cutting out the lamp at the predetermined time. In order to prevent unauthorized cutting in again of the lamp after it has been thus automatically cut out, I provide a locking-dog 109, which is pivoted upon the pivot 98 of the lever 97 and which has a downwardly-directed shoulder 110, above which it is provided with an incline 111. This locking-dog is free to swing away from the arm 101, opposite which it is located; but its motion toward said arm is limited by means of a pin 112 on the lever 97, which pin engages with an arm 113 of the locking-dog, as shown in Fig. 2. In the normal position of the parts, as shown in said figure, the locking-dog hangs clear of the path of the finger 100, so that its shoulder 110 does not prevent the upward movement of said finger and of the lever 94. Moreover, when the lever 97 is raised and the lever 94 descends the finger 100 will strike against the incline 111 and the locking-dog will swing away out of the path of said finger to permit the descent of the lever 94. When, however, the rod 104 has been depressed by the carbon-holder 19, the lever 97 is held in a raised position and the locking-dog 109 is swung over laterally until its shoulder 110 lies in the path of the finger 100, so that any attempt to cut in the lamp again by pressing upward on the actuating-rod 95 will serve merely to bring the finger 100 against the shoulder 110, and thus arrest the upward motion of the lever 94, thereby preventing the lifting of the switch-block 91 to an extent sufficient to cut in the lamp. Of course as soon as the case is opened by an authorized person this portion of the apparatus may be reset and the cutting in and out of the lamp may be effected in the manner previously described by the non-automatic mechanism for that purpose.

The upper-carbon holder is constructed in the manner shown in detail in Figs. 7 and 8 of the drawings. 114 indicates a supporting-yoke provided with tubular sleeves 115, which fit and slide upon the guides 20. A block 116, pivoted on an axis 117, supported from the yoke 114, has in turn suspended from it, by means of an axis 118 at right angles to the axis 117, the carbon-holder proper or carbon-clamp 119, which is thus free to swing in all directions. This latter is provided with a central aperture 120 to receive the carbon, and is further provided with a plurality of inclined recesses or passages 121, each of which contains a ball 122. The recesses or passages 121 are inclined downward and inward toward the carbon-receiving aperture 120 and communicate with the same, being, however, cut only partially through the wall of said aperture 120, so that while the balls 122 project, through the slits thus formed, into said aperture they cannot pass through said slits and thus fall out. It will thus be seen that when the end of the carbon is inserted into the aperture 120 the balls 122 will yield in an upward and outward direction, so as to permit this insertion; but any attempt to move the carbon downward and outward from the aperture will cause the balls to wedge between the carbon and the inclined outer walls of the recesses or passages, and thereby firmly clamp the carbon in position in the holder. It will thus be seen that the mere act of inserting the carbon in the holder and releasing it serves to clamp the carbon in position.

Since the upper-carbon holder is closed at its upper end and the carbon may not be withdrawn by pressing it upward entirely through the holder, I provide means for lifting the clamping-balls, so as to permit the removal of the carbon in a downward direction. To this end I employ a plurality of pins 123, which extend upward into the lower ends of the recesses or passages 121 and which when pressed upward serve to force the balls 122 upward and away from the aperture 120. In order to operate these pins simultaneously, I attach their lower ends to a ring or annulus 124, and I provide the upper ends of the pins with enlarged heads 125 to prevent the releasing device from dropping out and becoming separated from the holder.

The lower-carbon holder 22 is supported in a yoke 126 on a pivotal axis 127 by means of a ring 128, within which ring it is pivotally supported on an axis 129 at right angles to the axis 127, thus providing for a universal movement of the holder. The body of the holder proper, 130, has an aperture 131 to receive the carbon and is provided with a plurality of recesses or passages 132, which extend in an inclined direction downward and inward toward said carbon-receiving aperture. These passages communicate with said aperture at their lower ends, the passages extending only partially into said aperture in the form of slits or openings of less width than the passages proper. In these passages are located a plurality of balls 133, one in each passage, which balls, projecting into the carbon-receiving aperture, serve to clamp the carbon in position in the holder in the manner already described in referring to the upper-carbon holder. No provision is made for positively lifting the balls in the case of the lower-carbon holder, since the carbon may be withdrawn therefrom in an upward direction when it is desired to remove the same.

The globe-holder 134 is carried by the lower end of a rod or bar 135, which slides in a groove or recess in the arm 25. The rod 135 is guided and clamped in the arm 25 by means of a roller 136, which is mounted to move in inclined slots 137 in said arm. These slots are inclined downward toward the rod, so that the roller normally bears against the rod and serves to clamp the same in whatever position it is placed by reason of the roller binding or wedging between the edge of the rod or bar and the inclined wall of the slots. The globe-holder will thus be locked by its own weight in whatever position it may be placed. In order to release the globe-holder and permit its being lowered, I mount the roller 136 in a hinged frame 138, which is adapted to be operated by a rod 139, extending upward into the casing 15, where its upper end is accessible. By pulling upward on the rod 139 the frame 138 may be so swung as to move the roller 136 away from its engagement with the rod or bar 135, thereby permitting this latter to descend by gravity or to be lowered, as desired. This rod or bar 135 terminates at its upper end in a hook 140, which when the globe-holder is in its lowermost position is adapted to catch over the roller 136 in the manner indicated in dotted lines in Fig. 1 of the drawings. The globe-holder and globe are thus automatically caught and held at the downward limit of their motion and are so supported as to swing clear out of the way and allow the attendant free use of both hands in trimming or otherwise caring for the lamp.

The globe (indicated at 141) is closed at its lower end by the globe-holder 134, in which it is seated upon a suitable gasket or packing, while its upper end fits tightly within a disk or cover 142 on the under side of the bottom plate 16 of the casing. The globe is thus practically air-tight, except for such small spaces as may exist in order to permit free vertical movement of the carbon 18 and rods 23 and 139 through the plate 16 and disk 142. By reason of this practical exclusion of the external air the lamp is a "slow-burning" one, the consumption of the carbons being reduced to a minimum by reason of the oxygen of the air being prevented from having access thereto, while at the same time the globe becomes filled with a non-oxidizing gas or gases. In order to render this construction practicable and at the same time prevent the lamp from becoming inoperative through overheating by reason of such inclosing of the carbons, I provide a construction of the casing whereby the solenoids are protected from the heat which exists in the interior of said casing when the lamp is in use. To this end I provide on the exterior of the casing 15 recesses or bays 143, in which the solenoids 33 and 49 are located. These recesses are preferably formed by deflecting the wall of the casing inward, as shown in detail in Fig. 2 of the drawings, and said recesses may be inclosed or partially inclosed externally, so as to protect the solenoids from the weather or other exposure, by means of shields 144. These shields do not, however, meet the wall of the casing at their ends, open spaces being there left, so as to permit free access of the external air to the recesses in order to properly ventilate the same and prevent their attaining a temperature sufficiently high to affect the action of the solenoids.

In order to permit ready access to the interior of the casing, so far as that portion thereof between the plates 16 and 17 is concerned, said casing is provided with a hinged door 145, and in order to give access to the feeding mechanism which lies on top of the plate 17 the cap 82 is made removable, being adapted to seat itself upon the upper edge of the casing, as shown in Fig. 4, and being provided with recessed lugs 146, which are adapted to receive the ends of a locking turn-button 147 and a locking-lever 148, pivoted thereto. The turn-button is mounted upon a shaft 149, which is squared at its lower end, as indicated at 150, to receive a suitable key, by means of which said shaft may be rotated to lock or unlock the cap.

In practice it is desirable to provide some form of automatic cut-out for the lamp, and in the present instance I have shown such a cut-out adapted to be operated by the solenoids 33 and 49. In this construction 151 indicates a lever which is connected through the medium of a coil 152 and wire 153 with the binding-post 92. This lever has connected to one of its ends a second core 154, located within the solenoid 33. The other end of said lever is adapted to contact with a lever 155, which is in electrical connection by means of a coil 156 and wire 157 with the binding-post 93. The lever 155 is connected with a second core 158 within the solenoid 49, said second core being so weighted as to normally overcome the attraction of said solenoid. It will be seen that as soon as the lamp is switched into the main circuit or, if the lamp is already switched in, as soon as the current passes through the main circuit the solenoid 33 will be energized and will attract the core 154, thereby depressing the free end of the lever 151 and breaking the contact between said lever and the lever 155. Conversely, as soon as the current fails to pass through the lamp for any reason—such, for instance, as the burning out of the carbons—the solenoid 33 will be deënergized and the lever 151 will make contact with the lever 155, thereby short-circuiting the current between the binding-posts 92 and 93, and thereby continuing the current in the main circuit uninterruptedly. When the lamp is in circuit and the lever 151 out of contact with the lever 155, in case the carbons stick or for any other reason the arc becomes too long then the increase in the attractive power of the solenoid 49 will become sufficient to overcome the excess weight of the core 158 and will depress the lever 155, so as to cause it to contact with the lever 151, whereupon the lamp being cut out the solenoid 33 will become deënergized and the lever 30 will drop at that end thereof which carries the carbon-supporting drum and will cause the carbons to contact, and thus properly reëstablish the arc.

It will be understood, of course, that the action of the solenoid 49 is proportionate to the length of the arc or, in other words, to the distance between the carbons, so that while the feed of the carbon is normally a very slow one, the actuating-lever 46 moving only very gradually, nevertheless upon an undue increase in the distance between the carbons, due to the original establishing of the arc at too great a length or to any other cause, the action of the solenoid 49 will be correspondingly increased and the feed will be established and continued at a higher rate of speed than the normal until the proper distance between the carbons is restored.

In Figs. 1 to 10 of the drawings I have shown a construction in which in order to compensate for the unequal rate at which the carbons are consumed the upper carbon is of greater diameter than the lower one, the rate of feed of the two carbons being equal. It is obvious, however, that the lamp may be readily adapted for use with carbons of the same size, and this form of lamp is particularly desirable for use in places where owing to restrictions of space a short lamp is required. For this purpose I employ a construction such as is indicated in Fig. 12 of the drawings, wherein carbons of equal diameter are used, the rate of feed of the lower carbon being diminished to about one-half that of the upper carbon. This is accomplished by providing the rod or bar 23, which carries the lower carbon, with a pulley or guide 159, through which the flexible connection 29 is passed, its end being carried up and secured to some fixed part of the lamp—as, for instance, the plate 17. It will be at once seen that as the drum 28 is rotated the rod 23 and the lower carbon will move at just one-half the rate of speed of the upper carbon, and since the range of motion of the lower carbon is thus reduced one-half it is obvious that the total length of the lamp may be correspondingly reduced. I have described the flexible connection 29 as passing around a pulley at the upper end of the rod 23, and this is a desirable construction for the purpose of avoiding friction or binding at this point; but it is obvious that all that is essential at this point is some sliding connection which will support the rod and through which the flexible connecting device 29 may move freely.

I claim—

1. In an arc-lamp, the combination, with carbons movable toward and from each other, of a vibrating lever, a drum carried by said lever, a flexible device connecting said carbons and wound around said drum and extending therefrom directly to the carbon-supporting devices, whereby when said drum moves bodily the distance between the carbons is not affected, a gear-wheel connected and moving with said drum, a coil located in the main circuit and having a core or armature connected to said lever, and an electric motor located in a shunt-circuit and provided with a pinion with which said gear meshes when said coil is energized, whereby said gear and drum are partially rotated to cause both carbons to move away from each other and strike the arc, substantially as described.

2. An arc-lamp-feeding mechanism, comprising means for connecting the carbons, whereby they may be moved toward each other as consumed, and a motor for actuating said mechanism comprising a coil located in a shunt-circuit, a core or armature for said coil, an actuating-lever connected to said core, means for moving said lever in opposition to the attraction of the coil, a dash-pot connected with said lever, whereby a slow movement is imparted thereto, a circuit-breaking device for the shunt-circuit, and means controlled by the movement of the actuating-lever for positively and instantaneously operating said circuit-breaking devices, substantially as described.

3. In an arc-lamp, the combination, with the carbons, their flexible connection and a drum and gear-wheel therefor, of an actuating-lever adapted to be operatively connected with said gear-wheel, a coil located in a shunt-circuit and having a core or armature connected with one end of said lever, a counterweight and dash-pot connected with the other end of said lever, and a circuit-breaking device controlled by the movement of the actuating-lever, substantially as described.

4. In an arc-lamp, the combination, with the carbons, and an electric motor for feeding the same toward each other located in a shunt-circuit and comprising a vibrating actuating-lever, of a circuit-breaking device for the shunt-circuit, comprising a normally-depressed circuit-breaking lever, a latch for maintaining the same in a raised position, an intermediate lever adapted when depressed to raise the circuit-breaking lever, and a latch for maintaining said intermediate lever in a raised position, the actuating-lever being adapted to raise the intermediate lever and to alternately trip the latches of the intermediate and circuit-breaking levers, substantially as described.

5. In an arc-lamp, a manually-operated device for actuating a cut-out switch comprising, in combination, an actuating-lever connected with the movable member of the switch for bringing the same into contact with the fixed member, a releasing-lever provided with a beveled shouldered arm with which said actuating-lever engages, and separate means connected with each of said levers and accessible externally of the lamp-casing for independently operating said levers, substantially as described.

6. In an arc-lamp, the combination, with a switch or cut-out and its releasing-lever, of an adjustable stop-arm located in the path of one of the carbon-holders and operatively connected with said releasing-lever, substantially as described.

7. In an arc-lamp, the combination, with a switch or cut-out and its releasing-lever, of a rod connected to said lever and extending parallel with the line of travel of the upper carbon-holder, and a stop-arm adjustably mounted on said rod and extending into the path of the carbon-holder, substantially as described.

8. In an arc-lamp, the combination, with a switch or cut-out, and a movable carbon-holder, of manually-operative means accessible externally of the casing for operating said switch, means actuated by one of the carbon-holders for automatically operating said switch at a predetermined time, and means inclosed within the casing for automatically locking the manually-operative switch-operating mechanism, substantially as described.

9. In an arc-lamp, the combination, with a switch or cut-out, an actuating-lever therefor, and a releasing-lever with which said actuating-lever engages, of a stop-arm located in the path of one of the carbon-holders and operatively connected with the releasing-lever, and a locking-dog controlled by said releasing-lever and adapted to engage the actuating-lever when the releasing-lever is actuated by said stop-arm, substantially as described.

10. In an arc-lamp, the combination, with the carbons and their inclosing globe, of feeding mechanism located above and outside of said globe, a separate casing inclosing said feeding mechanism, and coils controlling the feeding mechanism and mounted externally on the casing, whereby said coils are exposed to the external air and protected from the heat of the lamp, both directly from the carbons and by convection from the feeding mechanism, and their effect upon the feeding mechanism is thereby rendered more uniform, substantially as described.

11. In an arc-lamp, the combination, with the carbons and their inclosing globe, of the carbon-feeding mechanism, a casing inclosing said feeding mechanism and provided with external bays or recesses, and coils controlling said feeding mechanism and mounted in said bays or recesses, substantially as described.

12. In an arc-lamp, the combination, with the frame having a downwardly-extending arm provided with inclined ways, of a globe-holder having a supporting-rod adapted to slide in said arm, a roller mounted in said inclined ways, and means accessible externally of the globe for moving said roller out of engagement with the supporting-rod, substantially as described.

13. In an arc-lamp, the combination, with the frame and downwardly-extending arm, of a roller mounted in inclined ways in said arm, and a globe-holder having a supporting-rod mounted to slide in said arm and provided with a terminal hook or projection to engage said roller, substantially as described.

14. In an arc-lamp, the combination, with the frame and its downwardly-extending arm provided with inclined ways, of a globe-holder having a supporting-rod adapted to slide in said arm, a roller mounted in said inclined ways, a pivoted yoke supporting said roller, and a rod connected to said yoke and extending upward into the casing of the lamp, substantially as described.

15. In an arc-lamp, the combination, with the carbons, their flexible connection and a drum and gear-wheel therefor, of a vibrating lever operatively connected with said gear-wheel, a coil located in a shunt-circuit and having a core or armature connected with one end of said lever, a counterweight connected with the other end of said lever, means for varying the weight of said counterweight, and a circuit-breaking device controlled by the movement of said actuating-lever, substantially as described.

JAMES M. WILLARD.

Witnesses:
 JOHN H. CULVER,
 GEORGE H. KELLINGTON.